United States Patent
Stenson et al.

(10) Patent No.: US 9,151,654 B2
(45) Date of Patent: Oct. 6, 2015

(54) METHOD AND APPARATUS FOR CAPTURING ENERGY FROM A METER READING DEVICE

(75) Inventors: Michael Stenson, Farmington, PA (US); James Duncan, Uniontown, PA (US)

(73) Assignee: SENSUS USA INC., Raleigh, NC (US)

( * ) Notice: Subject to any disclaimer, the term of this patent is extended or adjusted under 35 U.S.C. 154(b) by 1196 days.

(21) Appl. No.: 13/094,474

(22) Filed: Apr. 26, 2011

(65) Prior Publication Data

US 2012/0274478 A1 Nov. 1, 2012

(51) Int. Cl.
| | |
|---|---|
| G08C 15/06 | (2006.01) |
| G01F 15/06 | (2006.01) |
| G01F 1/05 | (2006.01) |
| G01F 15/075 | (2006.01) |
| G01D 4/00 | (2006.01) |
| G01D 5/06 | (2006.01) |

(52) U.S. Cl.
CPC .............. *G01F 15/066* (2013.01); *G01D 4/002* (2013.01); *G01F 1/05* (2013.01); *G01F 15/063* (2013.01); *G01F 15/0755* (2013.01); *G01D 5/06* (2013.01); *Y02B 90/241* (2013.01); *Y02B 90/248* (2013.01); *Y04S 20/32* (2013.01); *Y04S 20/52* (2013.01)

(58) Field of Classification Search
CPC ....... G01F 15/066; G01F 1/05; G01F 15/063; G01F 15/0755; Y02B 90/248; Y02B 90/241; Y04S 20/32; Y04S 20/52; G01D 4/002; G01D 5/06

USPC ...................................................... 340/870.02
See application file for complete search history.

(56) References Cited

U.S. PATENT DOCUMENTS

| | | | |
|---|---|---|---|
| 3,820,090 A | 6/1974 | Wiegand | |
| 4,132,981 A * | 1/1979 | White | 340/870.02 |
| 4,758,836 A * | 7/1988 | Sciulli | 340/870.31 |
| 4,782,341 A | 11/1988 | Gray | |
| 5,619,192 A | 4/1997 | Ayala | |
| 5,659,300 A | 8/1997 | Dresselhuys | |
| 6,181,257 B1 | 1/2001 | Meek et al. | |
| 6,612,188 B2 | 9/2003 | Hamilton | |
| 6,657,552 B2 | 12/2003 | Belski et al. | |
| 7,424,377 B2 | 9/2008 | Hamilton et al. | |
| 7,747,415 B1 | 6/2010 | Churchill | |
| 2006/0114121 A1 * | 6/2006 | Cumeralto et al. | 340/870.02 |
| 2007/0284293 A1 * | 12/2007 | Pitchford et al. | 210/85 |
| 2009/0135843 A1 | 5/2009 | Veillette | |
| 2009/0255742 A1 * | 10/2009 | Hansen | 180/65.31 |

* cited by examiner

*Primary Examiner* — Edwin Holloway, III
(74) *Attorney, Agent, or Firm* — Murphy, Bilak & Homiller, PLLC

(57) ABSTRACT

Electronic circuits in a register associated with a commodity usage meter capture energy from a meter reading device when the device is coupled to the register (e.g., either electrically or inductively coupled) for the purpose of reading metered quantity data from the register. Electrical charge obtained from the reading device may be stored in a high-capacity storage capacitor. When the capacitor is sufficiently charged, it provides power to at least part of the register circuits, such as a controller, for at least the duration of the communication session with the reading device. In some embodiments, the capacitor may additionally supply sufficient power to operate the register until a subsequent reading device coupling.

13 Claims, 3 Drawing Sheets

METHOD AND APPARATUS FOR CAPTURING ENERGY FROM A METER READING DEVICE

FIELD OF THE INVENTION

The present invention relates generally to metering the flow of commodities, and in particular to a register for a meter that is powered by energy captured from a meter reading device.

BACKGROUND

Meters are widely used to measure the volumetric flow of commodities—particularly those provided by utilities, such as water, natural gas, and electricity. As one example, utilities typically interpose a meter into a conduit (e.g., pipe or wire) supplying a commodity to a residential or commercial end user. The meter includes some transducer operative to sense the volumetric flow of the commodity, and a register operative to maintain metered quantity data, such as a cumulative count of volume units of the commodity that have flowed through the meter. The count is periodically read, and by maintaining a record of at least the most immediate prior reading, interim usage or consumption of the commodity may be ascertained, and used for billing purposes, usage analysis, and the like.

Manually reading commodity usage meters is labor-intensive, time-consuming, and error-prone. Hence, a variety of electronic commodity usage meters is known in the art. For example, the register in many modern commodity usage meters houses electronic circuits that maintain the metered quantity data. The metered quantity data may be read from a register by a reading device applied to each meter, such as via electrical contacts or inductive coupling. Alternatively, a register may include an electrical, optical, or RF interface, connecting it to a communication network (e.g., LAN, WAN, cellular network, or the like), via which the register may be remotely interrogated, or may periodically transmit its identification and metered quantity data.

Electronic circuits in the register of a commodity usage meter require a power source. In many applications, a power source is not available, or would be expensive to install or extend to the meter, particularly given the limited functionality of the register and the relatively small amount of power required. In such applications, batteries may be sufficient to power the register of a commodity usage meter. However, batteries have a limited lifetime, their performance may vary with environmental factors such as temperature, and they require periodic recharge and/or replacement. Hence, an alternative, inexpensive power source for the register of a commodity usage meter, which requires no maintenance or replacement, would be advantageous.

A commodity usage meter is only active when the metered commodity flows—that is, when the commodity (e.g., water) is being consumed by the end user. In many cases, the meter spends the vast majority of its time in an inactive state. During such times, electronic circuits in the register may be placed in an inactive, low-power state, known in the electronic arts as "sleep mode," to conserve power. Even when the meter, and hence electronic circuits in the register, is active, the register's fundamental function of processing a signal from a transducer in the meter, to update and maintain metered quantity data, does not require extensive consumption of power. For example, it may comprise simply detecting pulses from a sensor and incrementing a counter. In these cases, the greatest power demand of the register may be during a communication session with a reading device—that is, the operation of transmitting the accumulated metered quantity data out of the register. Accordingly, power source that is necessarily available during a metered quantity data communication session would be particularly advantageous.

SUMMARY

According to one or more embodiments of the present invention described and claimed herein, electronic circuits in a register associated with a commodity usage meter capture energy from a meter reading device when the device is coupled to the register (e.g., either electrically or inductively coupled) for the purpose of reading metered quantity data from the register. Electrical charge obtained from the reading device may be stored in a high-capacity storage capacitor. When the capacitor is sufficiently charged, it provides power to at least part of the register circuits, such as a controller, for at least the duration of the communication session with the reading device. In some embodiments, the capacitor may additionally supply sufficient power to operate the register until a subsequent reading device coupling.

One embodiment relates to a register associated with a meter and operative to record and report flow data for a commodity. The register includes one or more sensors, each operative to intermittently generate a signal related the flow rate of the commodity. The register also includes a controller operative to receive and process the sensor signals to generate data indicative of a metered quantity of the commodity. The controller is further operative to store the metered quantity data, and to output the metered quantity data to a reading device during a communication session according to a predetermined protocol. The register further includes a reading device interface connected in data flow relationship with the controller, and a detector connected to the interface and to the controller. The detector is operative to detect the presence of a reading device. The register additionally includes a capacitor connected to the interface in power flow relationship. The capacitor is operative to store charge provided by the reading device during at least part of the communication session. When the capacitor is sufficiently charged, it is further operative to power at least the controller for at least the duration of the communication session.

Another embodiment relates to a method of recording and reporting flow data for a commodity, by a register consisting of electrical circuits, the register being associated with a meter. A signal related the flow rate of the commodity is intermittently received from a sensor proximate the meter. The sensor signal is processed to generate data indicative of a metered quantity of the commodity. The metered quantity data is storing. The presence of a reading device, operative to extract at least the metered quantity data during a communication session according to a predetermined protocol, is detected. Energy is captured from the reading device during the communication session and stored. The captured energy is used to power at least some circuits in the register for at least the duration of the communication session.

DETAILED DESCRIPTION

Figure 1:
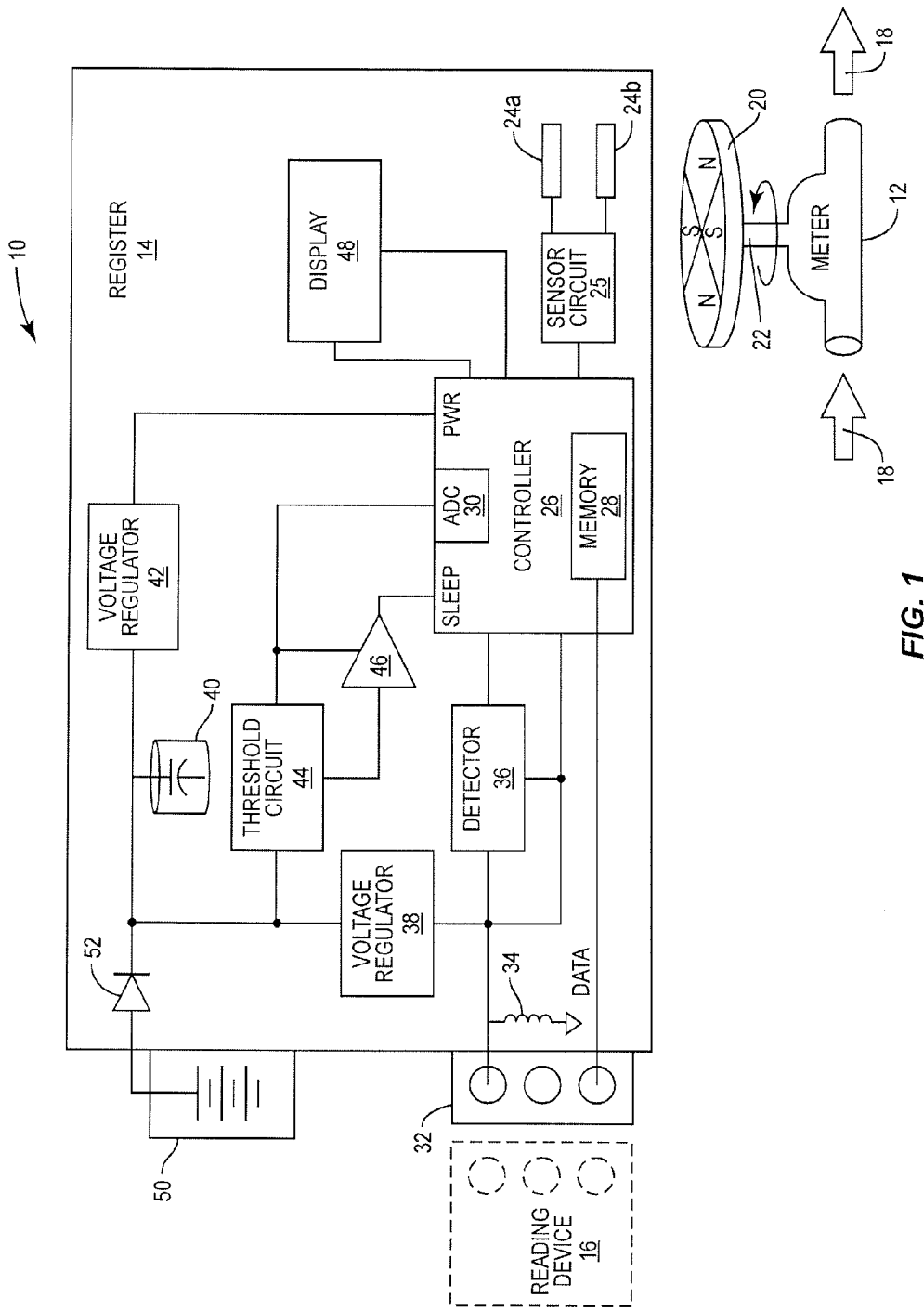
FIG. 1 is a functional block diagram of a metering environment.

A representative commodity metering environment 10 is depicted in FIG. 1. In this particular example, the commodity being meter is water. However, this is not limiting, and in general, the present invention is applicable to registering the metering any number of commodities. The metering environment 10 comprises a meter 12, a register 14, and a reading device 16 which is intermittently or periodically coupled to the register 14 for the purpose of extracting metered quantity data.

The meter 12 meters the flow of a commodity through it, as indicated by the flow arrows 18. In the example of a water meter 12, one known design uses the kinetic energy of the water flow turn a shaft 22, which in turn rotates a disk 20 on which multiple magnets are located, or which is magnetized to have multiple poles, as indicated. The rotational speed of the disk 20 is directly related to the flow rate of water through the meter 12.

The register 14 is associated with the meter 12, and is configured and arranged such that sensors 24a and 24b are proximate the disk 20. These sensors 24a and 24b are operative to detect and quantify rotation of the disk 20 by detecting changes in polarity of magnetic flux from the disk 20 poles. Outputs from these sensors 24a and 24b are detected, amplified, and otherwise processed by a sensor circuit 25, which in turn transmits one or more sensor signals to a controller 26.

In one embodiment, the sensors 24a and 24b each comprise a "Wiegand Wire." The Wiegand Wire, named for its inventor and described in U.S. Pat. No. 3,820,090, is a device that generates electrical signals when it is exposed to a magnetic field with changing flux polarity. The Wiegand Wire is also known in the art as a Barkenhausen Effect sensor. A suitable sensor 24a, 24b in one embodiment is the Series 2001 Wiegand Wire Sensor manufactured by HID Corporation of North Haven, Conn. This sensor 24a, 24b is capable of detecting rotations from 0 Hz to 50 Hz of a two-pole magnet disk 20.

A Wiegand Wire sensor 24a, 24b itself does not require a power source. As the disk 20 rotates, the movement of the magnets induces alternating fields of magnetic flux within the Wiegand Wire sensors 24a, 24b, which are located in close proximity to the disk 20. The rate and direction of fluid flow through the meter 12 may be determined by analyzing the number, rate, and relative timing of pulses generated by the sensors 24a, 24b. This may be accomplished directly by the controller 26, or alternatively may be processed by the sensor circuit 25. In either case, in one embodiment, the sensor inputs generate interrupts to the controller 26. This allows the controller 26 to continue processing inputs from the sensors 24a, 24b (that is, continue to accumulate quantities metered by the meter 20), when the controller 26 is performing other tasks, such as system overhead or transmitting metered quantity data to a reading device 16, as described further herein. In one embodiment, the unit volume of fluid flow per sensor pulse depends on the size of the meter 12 body, and thus the sensor pulses are easily calibrated to volumetric quantities. Of course, in other embodiments, such as where the meter 12 measures other commodities, such as gas or electricity, operation of the sensors 24a, 24b will differ. Those of skill in the art are able to apply the energy-capture and power-saving advantages of the present invention to a broad array of metering applications, given the teachings herein.

Signals from the sensors 24a, 24b, as processed by the sensor circuit 25, are received by a controller 26. The controller 26 is preferably a low-power microprocessor, but in general may comprise a custom state machine implemented in discrete hardware, programmable logic, or an ASIC; programmable logic together with appropriate firmware; a stored-program microprocessor together with appropriate software; or any combination thereof. In one embodiment, a suitable processor is the MSP430F413 Microcontroller manufactured by Texas Instruments of Dallas, Tex., or the PIC16F1937 Microcontroller manufactured by MicroChip Technology, Inc. of Chandler, Ariz.

The controller receives signals from the sensors 24a, 24b, and further processes the signals to generate data representing the metered quantity of a commodity. The controller includes memory 28 operative to store at least the metered quantity data. The memory may comprise, e.g., one or more hardware registers, such as a counter, and/or random access memory such as SRAM, DRAM, Flash, or the like. Although depicted as internal to the controller 26, the memory 28 may be located externally, and operatively connected to the controller 28 via appropriate interfaces. In one embodiment, the controller 26 additionally includes an analog-to-digital-converter (ADC) 30, to monitor storage capacitor 40 voltage levels, as described further herein.

The register 14 includes a reading device interface 32. A reading device 16, when present, couples to the register 14 through the interface 32. In one embodiment, the reading device 16 electrically coupled to the register 14, via electrical contacts in the interface 32. In another embodiment, the reading device 16 inductively couples to a coil 34 in the register 14. In either case, the reading device 16 couples to the register 14 in both a power-sharing and data-transfer relationship. That is, the register 14 is operative to extract power from the reading device 32, and the reading device 32 is operative to receive metered quantity data from the controller 26, when the reading device 32 is operatively coupled to the register 14. In some embodiments, such a coupling (i.e., a meter reading operation) occurs on the order of monthly.

A detector circuit 36, interposed between the controller 26 and the reading device interface 32, is operative to detect the coupling of a reading device 16 to the interface 32 (whether a direct or inductive coupling), and to generate an appropriate signal to the controller 26, such as an interrupt. In this manner, the controller 26 may safely enter a "sleep mode" when no fluid is flowing through the meter 12, and hence no metering signals are generated by the sensors 24a, 24b, without "missing" a meter-reading communication session by a reading device 16. In addition to detecting the presence of a reading device 16 and alerting the controller 26 of such, the detector circuit 36 may, in some embodiments, also format metered quantity data being read, to conform to a predetermined protocol.

When a reading device 16 is coupled to the register 14 via the interface 32 (whether electrically or inductively coupled), a voltage is present (i.e., at a contact of interface 32 or induced across the coil 34) within the register 14. This voltage is regulated by a voltage regulator 38, to not exceed a peak voltage tolerable by a storage capacitor 40. In one embodiment, a suitable voltage regulator 38 is the MIC5205 Load Drop-Out (LDO) regulator manufactured by Micrel Inc. of San Jose, Calif.

The storage capacitor 40 is preferably a high-capacity storage capacitor, such as an electric (or electrochemical) double-layer capacitor (EDLC), also known in the art as a Hybrid Layered Capacitor (HLC), super-capacitor, ultra-capacitor, super-condenser, or the like. High-capacity storage capacitors 40 are characterized by an energy storage density an order of magnitude (or more) greater than a comparably-sized conventional electrolytic capacitor. Although high-capacity storage capacitors 40 store less energy per unit weight than many batteries, their ability to store charge for long durations (e.g., several months) is similar to many batteries. Furthermore, high-capacity storage capacitors 40 are superior to batteries as rechargeable power sources in several respects, such as: long life with little degradation over many charge cycles; fast charge rates; low internal resistance and hence high efficiency; high output power; and low toxicity of materials. In one embodiment, a suitable high-capacity storage capacitor 40 is the HLC-1520A HLC manufactured by Tadiran Batteries, Ltd. of Lake Success, N.Y.

According to embodiments of the present invention, the storage capacitor 40 is charged by a regulated voltage from the voltage regulator 38 when a reading device 16 is initially coupled to the register 14 via the interface 32 (whether electrically or inductively coupled). The storage capacitor 40 charges rapidly, and is able to provide sufficient power to power the controller 26 for at least a communication session with the reading device 16. That is, once the storage capacitor 40 is fully charged, the controller 26 engages in a transfer of the metered quantity data stored in memory 28 to the reading device 16, according to a predetermined protocol (and in some embodiments, with the assistance of the detector circuit 36), while powered by the storage capacitor 40.

In some embodiments, the storage capacitor 40 holds sufficient charge, for a sufficient duration, to power the controller 26 long after the communication session with the reading device 16 terminates. That is, as the sensors 24a, 24b continue to detect the flow metering action of the meter 12, and the controller 26 generates and stores metered quantity data, the controller 26 continues to operate under power supplied by the storage capacitor 40. To this end, the controller 26 is preferably a low-power microprocessor that operates at a reduced voltage level relative to that of the storage capacitor 40. In this case, a voltage regulator 42 "steps down" voltage from the storage capacitor 40 to the proper voltage required for operation of the low-power controller 26.

Hence, in some embodiments, the storage capacitor 40 is the only source of stored power in the register 14 (aside from the sensors 24a, 24b, which generate power in response to the changing magnetic flux from the rotating disk 20, and which do not, in any event, store power). However, in some embodiments, a battery 50 provides power storage for operating the controller 26 if the storage capacitor 40 discharges too far. In one embodiment, a suitable battery is the TL-4902 Lithium-thionyl chloride battery manufactured by Tadiran Batteries, Ltd. of Lake Success, N.Y. Since Lithium batteries are non-rechargeable, battery 50 is protected from the storage capacitor 40 charging cycle by an isolator such as a diode 52. In one embodiment, a suitable diode 52 is the FDLL300 manufactured by Fairchild Semiconductor of San Jose, Calif. In embodiments including a battery 50, the storage capacitor 40 still charges a reading device 16 couples to the register 14, and supplies power to the controller 26 for the duration of a communication session (which is generally the highest power demand function of the controller 26).

In one embodiment, where the storage capacitor 40 is partially depleted, and hence may hold insufficient charge to power the controller 26 through a communication session, when a reading device 16 is initially coupled to the register 14, a threshold circuit 44, together with an op amp 46, maintains the controller 26 in "sleep mode" until the storage capacitor 40 has charged sufficiently to power the controller 26 for the communication session. In this case, an ADC circuit 30 within, or associated with, the controller 26 allows software executing on the controller 26 to monitor the voltage level of the storage capacitor 40. In other embodiments, where the storage capacitor 40 is expected to hold sufficient charge to power the controller 26 continuously from one meter-reading communication session to the next, the threshold circuit 44 and op amp 46 may be omitted.

In one embodiment, the controller 26 is operative to output the metered quantity data via a display 48, such as an LCD display. In one embodiment, the display 48 is driven whenever the controller 26 is awakened from sleep mode, such as whenever the meter 12 indicates fluid flow or when a reading device 12 is coupled to the register 14. In another embodiment, the display 48 is driven only when a reading device 12 is coupled to the register 14, and provides a back-up indication of the metered quantity data against the possibility of a malfunction of the reading device 16. In other embodiments, the display may be driven on-demand, such as when a cover of the meter 12 and register 14 assembly is opened, or at other times, as will be readily understood by those of skill in the art.

Figure 2:
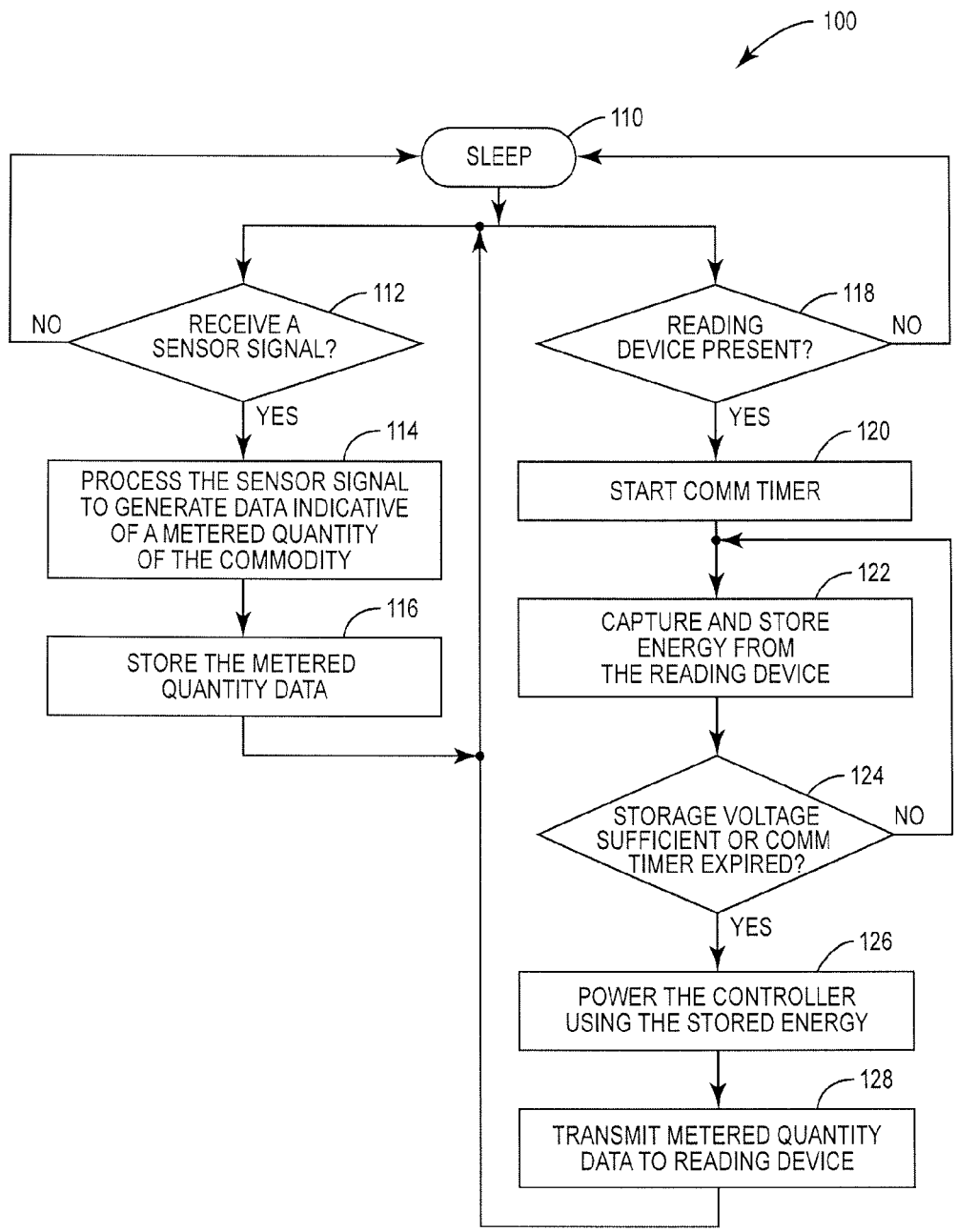
FIG. 2 is a flow diagram of a method of recording and reporting a meter reading.

FIG. 2 depicts a method 100 of recording and reporting flow data for a commodity, by a register 14 associated with a meter 12. Those of skill in the art will recognize that the controller 26, upon power-on, will have initialization routines to execute, and may run tests, diagnostics, calibration procedures, and the like, on the register 14, as known in the art. The method 100 of FIG. 2 then "begins" when the controller 26, having completed all such "housekeeping" tasks, enters a low-power "sleep mode" (block 110).

As the commodity to be metered flows through the meter 12, the sensors 24a, 24b generate and transmit signals to the controller 26 (block 112), which awakens the controller 26 from sleep mode. The controller 26 then processes the sensor signals to generate data indicative of a metered quantity of the commodity (block 114). The metered quantity data may, in one embodiment, comprise simply a counter that is incremented on receipt of each "forward" pulse from the sensors 24a, 24b. The controller 26 stores the metered quantity data (block 116), which may comprise writing a calculated value to memory 28. Alternatively, the data storage (block 116) may merge with the metered quantity data generation (block 114) by simply incrementing a counter used as the storage memory 28. If no more sensor signals are pending (block 112), that is, if no more metered commodity is flowing, the controller returns to sleep mode (block 110).

When a reading device 16 is coupled to the register 14 via the interface 32, the detector circuit 32 will generate an indication of such to the controller 26 (such as an interrupt), awakening it from sleep mode (block 118). In one embodiment, in which a predetermined communication protocol specifies a duration within which data transfer must be completed, the controller 26 starts a communication timer (block 120) (which may, for example, be internal to the controller 26). The communication timer preferably triggers an output, or interrupt, at a time prior to the expiration of the protocol maximum coupling duration that is sufficient to complete a communication session. Also upon coupling of the reading device 16 to the register 14, the storage capacitor 40 begins charging via the voltage regulator 38, thus capturing and storing energy from the reading device 16 (block 122). The voltage from the reading device 16 is present either at a contact on the interface 32 or via inductive coupling to a coil 34.

When the storage capacitor 40 is sufficiently charged, or, in one embodiment, if the communication timer expires (block 124), the controller 26, powered by partially discharging the storage capacitor 40 (block 126), engages in a communication session and transmits at least the metered quantity data to the reading device 16 (block 128). The controller 26 may additionally transmit other data, such as a unique device ID or a code representing the type or size of the meter 12. Upon completion of the communication session with the reading device 16, the reading device 16 is removed, and (if no fluid is flowing through the meter 12), the controller returns to sleep mode (block 110).

Although the control flow in FIG. 2 is depicted as branching at discrete decision blocks 112, 118, 124, those of skill in the art will recognize that the method 100 may be implemented as interrupt-driven, and that interrupts may be serviced according to predetermined priorities. Accordingly, for example, sensor signals received during a meter reading operation (e.g., blocks 120-128) may be serviced (e.g., according to blocks 114, 116), and the meter reading operation continued, although such control flow is not explicitly depicted in FIG. 2.

Figure 3:
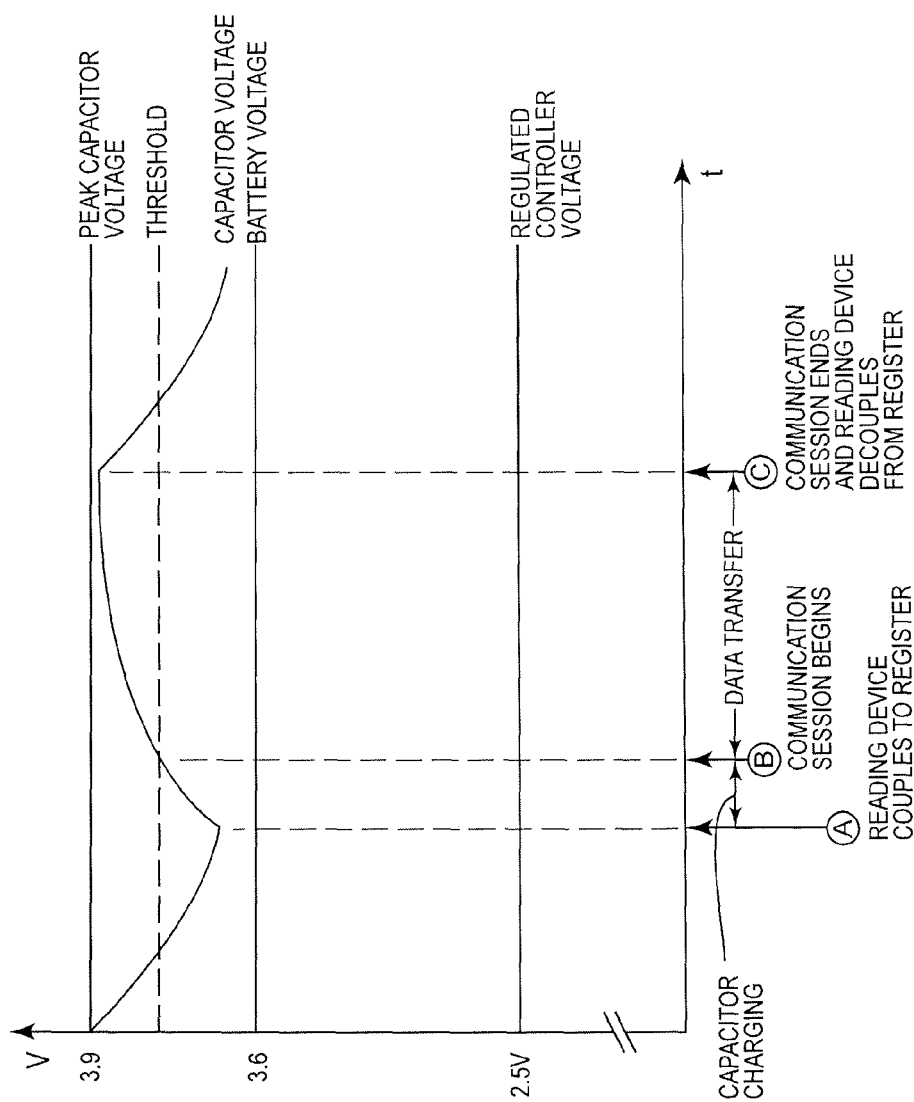
FIG. 3 is a voltage graph depicting the charging and discharging of a capacitor by energy captured from a reading device.

FIG. 3 depicts a timing diagram showing the storage capacitor 40 charge cycle during coupling by a reading device 16. Initially, the storage capacitor 40 is discharging, as it powers the controller 26, such as during metered quantity data logging operations (note the discharge curve is not to scale; in practice, it would have a much shallower slope).

At the time point marked A, a reading device 16 couples to the register 14 (either eclectically or inductively). The voltage derived from the reading device 16 (directly from an interface 32 contact or from the coil 34) is regulated to the peak capacitor voltage, e.g., 3.9V as depicted in FIG. 3, by the voltage regulator 38. The storage capacitor 40 begins charging, as indicated between time points A and B.

At time point B, the storage capacitor 40 voltage exceeds a threshold voltage, which may for example be monitored by the threshold circuit 44 and op amp 46. At this point, the controller 26 engages in a communication session with the reading device 16, transferring at least metered quantity data to the reading device 16. The storage capacitor 40 supplies power to the controller 26, which may operate at a lower voltage, such as 2.5V, achieved by the voltage regulator 42. Alternatively, time point B may be reached by expiration of a communication timer (not shown), started at time point A. As FIG. 3 indicates, the storage capacitor 40 continues to charge, extracting and storing energy from the reading device 16 for as long as it is coupled to the register 14, or until the storage capacitor 40 is fully charged.

At time point C, the controller 26 has transferred all desired data to the reading device 16, and the communication session ends. At this point, the reading device 16 decouples from the register 14, and the storage capacitor 40 begins discharging, as it powers the controller 16, e.g., performing additional metered quantity data logging. Here again, the storage capacitor 40 discharge curve is exaggerated in FIG. 3.

The charge on the storage capacitor 40 can be calculated by the standard electrical calculation, charge=charge current [Amp]*duration [sec]. Dividing this value by 3600 sec/Hr yields the charge in Amp-Hrs. The duration of operation possible on this charge is then charge [Amp-Hrs]/average system current [Hrs]=Hours of Operation. For example, assuming the following parameters:
Duration of reading device 16 coupling=2.5 sec.
Current derived from coupling=5 mA.
Average system current=20 uA. Then, $$5 \text{ mA} * 2.5 \text{ s} = 12.5 \text{ mAs}$$

$$\frac{12.5 \text{ mAs}}{3600 \text{ s/Hr}} = 3.472 \text{ uA} \cdot \text{Hr}$$

$$\frac{3.472 \text{ uA} \cdot \text{Hr}}{20 \text{ uA}} = 0.1736 \text{ Hr}$$

$$0.1736 \text{ Hr}\left(\frac{60 \text{ min}}{\text{Hr}}\right) = 10.41 \text{ min}$$

or the storage capacitor 40 can power the register 14 for nearly 10.5 minutes for each charging cycle. If the register 14 is read once per hour, then over a 20-year lifespan the system would operate for:

$$10.41 \text{ min}\left(\frac{24 \text{ times}}{\text{day}}\right)\left(\frac{365 \text{ days}}{\text{yr}}\right)(20 \text{ yr}) = 1.8238 \times 10^6 \text{ min}$$

$$1.8238 \times 10^6 \text{ min}\left(\frac{\text{Hr}}{60 \text{ min}}\right)\left(\frac{\text{day}}{24 \text{ Hr}}\right)\left(\frac{\text{yr}}{365 \text{ days}}\right) = 3.47 \text{ yr}$$

Use of the storage capacitor 40 in this example would eliminate nearly 3.5 years of battery powered operation. Of course, in cases where the system current were below the assumed 20 uA, the savings would be even greater.

FIG. 3 depicts the battery 50 voltage, e.g., 3.6V. As discussed above, in some embodiments the battery 50 is not necessary, as the storage capacitor 40 contains sufficient charge to power the controller 26 through many metered quantity data logging instances, until the next reading of metered quantity data by a reading device 16 (and hence recharging of the storage capacitor 40). However, even in embodiments in which the battery 50 is present, since the diode 52 isolates the battery 50 from the storage capacitor 40 charging circuit, the battery 50 would only itself begin to discharge if the storage capacitor 40 voltage were to drop below the battery 50 voltage (e.g., 3.6V). Hence, powering the controller 26 with the storage capacitor 40 prolongs battery 50 life, greatly reducing the necessity and expense of regularly replacing batteries 50 in field-deployed commodity metering systems 10.

In embodiments without a battery 50, the present invention provides a means for continuous powering of the register 14 of a commodity metering system 10, between "meter reading" events. By capturing and storing energy from a reading device 16, the register 14 is free from any requirement of an external energy source. This may dramatically reduce installation and operation costs, as well as eliminate costly battery 50 inspection and replacement operations.

Although described herein in the context of a fluid (e.g., water) meter 12, those of skill in the art will recognize that the energy capture and storage of embodiments of the present invention are readily applicable to registers 14 associated with meters 12 operative to meter a wide variety of commodities, such as natural gas, water, electricity, and the like. Furthermore, the present invention is not restricted to registers 14 associated with meters 12 at the facilities of residential or commercial utility customers, but may be advantageously employed wherever a commodity usage meter 12 that is regularly read with a reading device 16, is without a ready power source, and/or where the shortcomings of battery 50 power sources alone make that approach costly or otherwise problematic.

The present invention may, of course, be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

What is claimed is:
1. A register associated with a meter and operative to record and report flow data for a commodity, comprising:
 a reading device interface configured for operatively coupling to a reading device that is intermittently coupled to the register for establishing communication sessions with the register to read out metered quantity data from the register;

one or more sensors operative to generate sensor signals, in response to the flow of the commodity through the meter;

a controller operative to generate and store the metered quantity data, based on receiving and processing the sensor signals as they occur, and further operative to establish a communication session with the reading device, in response to detecting that the reading device is coupled to the register, and to output the metered quantity data via the reading device interface during the communication session, in accordance with a predetermined protocol; and a storage capacitor coupled to the reading device interface and operative to power the controller from stored charge during each communication session with the reading device and during the intervals between the communication sessions, based on charging from a voltage provided by the reading device during each communication session.

2. The register of claim 1, further comprising a feedback circuit operative to monitor the charge of the storage capacitor, and further operative to prevent the controller from engaging in a data transfer with the reading device during a communication session until the storage capacitor reaches a predetermined charge.

3. The register of claim 1, wherein, when the storage capacitor holds stored charge, a capacitor voltage is present on a positive terminal of the storage capacitor, and wherein the positive terminal of the storage capacitor is connected to a positive battery terminal through an isolation diode, so that the storage capacitor powers the controller, when the capacitor voltage is high enough to reverse bias the isolation diode, and is powered from a battery coupled to the positive battery terminal, when the capacitor voltage falls to a level at which the isolation diode becomes forward biased.

4. The register of claim 1, further comprising a first voltage regulator interposed between the reading device interface and the storage capacitor, and operative to provide the storage capacitor with a charging voltage that is derived from the voltage provided by the reading device and that is lower than a peak voltage output by the reading device.

5. The register of claim 4, further comprising a second voltage regulator interposed between a positive terminal of the storage capacitor and a power input of the controller, and operative to regulate the capacitor voltage to a lower supply voltage at the power input of the controller.

6. The register of claim 5, further comprising a battery having its positive terminal coupled to the positive terminal of the storage capacitor through an isolation diode that isolates the battery from the charging voltage applied to the storage capacitor by the first voltage regulator, so that the controller is powered either from the storage capacitor or the battery, in dependence on the level of the stored charge in the storage capacitor.

7. The register of claim 6, wherein the first voltage regulator is configured to provide the charging voltage at a voltage level higher than the battery voltage, so that the storage capacitor charges to a capacitor voltage that is higher than the battery voltage and thereby powers the controller until such time as the storage capacitor has discharged to a capacitor voltage at which the isolation diode becomes forward biased.

8. The register of claim 1, wherein the reading device interface comprises electrical contacts.

9. The register of claim 1, wherein the reading device interface comprises a coil inductively coupled to the reading device.

10. The register of claim 1, wherein the storage capacitor comprises a Hybrid Layered Capacitor (HLC) or an Electric Double Layer Capacitor (EDLC).

11. The register of claim 1, wherein the storage capacitor is sized to supply sufficient power to operate at least the controller of the register during an assumed meter reading interval between consecutive communication sessions.

12. The register of claim 11, wherein the storage capacitor has a storage capacity corresponding to an assumed meter reading interval of at least one month.

13. The register of claim 1, wherein each of the one or more sensors is operative to detect changes in a magnetic field in the meter, and wherein the sensor comprises a Wiegand wire or a Hall Effect sensor.

* * * * *